(12) United States Patent
Behroozi et al.

(10) Patent No.: US 11,254,409 B2
(45) Date of Patent: Feb. 22, 2022

(54) SUPERPRESSURE BALLOON THERMAL CONTROL WITH LOW-EMISSIVITY CAP AND ACTIVE AIR VENTING

(71) Applicant: Aerostar International, Inc., Sioux Falls, SD (US)

(72) Inventors: Cyrus Behroozi, Menlo Park, CA (US); Tyler Gore, Sunnyvale, CA (US); Kevin Roach, Boulder Creek, CA (US)

(73) Assignee: Aerostar International, Inc., Sioux Falls, SD (US)

( * ) Notice: Subject to any disclaimer, the term of this patent is extended or adjusted under 35 U.S.C. 154(b) by 132 days.

(21) Appl. No.: 16/708,561

(22) Filed: Dec. 10, 2019

(65) Prior Publication Data

US 2021/0171180 A1    Jun. 10, 2021

(51) Int. Cl.
*B64B 1/62*    (2006.01)
*B64B 1/64*    (2006.01)
*B64B 1/40*    (2006.01)

(52) U.S. Cl.
CPC .............. *B64B 1/62* (2013.01); *B64B 1/40* (2013.01); *B64B 1/64* (2013.01)

(58) Field of Classification Search
CPC .... B64B 1/40; B64B 1/44; B64B 1/62; B64B 1/64
See application file for complete search history.

(56) References Cited

U.S. PATENT DOCUMENTS

| | | |
|---|---|---|
| 3,260,480 A | 7/1966 | Ash et al. |
| 3,484,058 A | 12/1969 | Struble |
| 4,094,299 A | 6/1978 | Voelker |
| 4,986,494 A * | 1/1991 | Tockert ............... B64B 1/58 244/96 |
| 5,538,203 A | 7/1996 | Mellady |
| 5,672,406 A | 9/1997 | Challis et al. |

(Continued)

OTHER PUBLICATIONS

Goodyear Aerospace Corporation, Goodyear Aerospace Conceptual Design Maritime Patrol Airship, 1979, pp. 1-65.

(Continued)

*Primary Examiner* — Philip J Bonzell
*Assistant Examiner* — Tye William Abell
(74) *Attorney, Agent, or Firm* — Schwegman Lundberg & Woessner, P.A.

(57) ABSTRACT

Aspects of the technology relate to temperature regulation for high altitude, long duration balloons, such as balloons that operate in the stratosphere for weeks, months or longer. A balloon covering overlays the balloon envelope, providing an opaque or otherwise light-reflective layer with low emissivity that blocks or reflects optical and/or infrared light. Heat from within the envelope is reflected back from the covering toward the envelope, while light from the sun is reflected back towards the environment. An active venting system is employed to draw in cooler ambient air from the external environment while expelling warmer air from within the envelope. Vent and air intake assemblies of the active venting system are actuated in view of current and/or predicted balloon conditions to regulate internal balloon temperature. This approach reduces repeated pressure changes, which can put undue stress on the balloon envelope and adversely affect the operational lifespan of the system.

17 Claims, 11 Drawing Sheets

(56) References Cited

U.S. PATENT DOCUMENTS

| | | | |
|---|---|---|---|
| 6,290,172 B1 | 9/2001 | Yajima et al. | |
| 6,305,641 B1 | 10/2001 | Onda | |
| 7,469,857 B2 | 12/2008 | Voss | |
| 8,304,073 B2 | 11/2012 | Davies et al. | |
| 8,998,128 B2 * | 4/2015 | Ratner | B64B 1/62 244/31 |
| 9,296,461 B1 | 3/2016 | Roach | |
| 9,327,816 B1 * | 5/2016 | Mathe | B64B 1/44 |
| 9,511,844 B1 * | 12/2016 | DeVaul | B64B 1/44 |
| 9,527,569 B2 | 12/2016 | Fournier et al. | |
| 9,534,504 B1 * | 1/2017 | Gartner | B64B 1/62 |
| 10,336,432 B1 * | 7/2019 | Farley | B64B 1/40 |
| 10,549,505 B2 | 2/2020 | Tibbits et al. | |
| 2009/0233067 A1 | 9/2009 | Doornheim et al. | |
| 2016/0340826 A1 | 11/2016 | Tibbits et al. | |
| 2018/0195213 A1 | 7/2018 | Tibbits et al. | |
| 2021/0071326 A1 | 3/2021 | Tibbits et al. | |

OTHER PUBLICATIONS

Jones, Jack A., Innovative Balloon Buoyancy Techniques for Atmospheric Exploration, 1999, pp. 1-6.

Kreith, Frank and Warren John C., Thermal Analysis of Balloon-Borne Instrument Packages, National Center for Atmospheric Research, Jan. 1970, pp. 1-34.

Voss, Paul B., et al., Altitude Control of Long-Duration Balloons, Journal of Aircraft, vol. 42, No. 2, Mar.-Apr. 2005.

"MIR (Montgolfière Infrarouge): The Stratospheric Balloon of the CNES", Available Online at: <https://ballonsolaire.assoc.pagespro-orange.fr/en-historique3.htm>, retrieved from the Internet Sep. 3, 2018, 2 pages.

"Mylar polyester film", DuPont Teijin Films, Product Information, Jun. 2003, 6 pages.

"Vin Lally and the GHOST Balloon Project", Challenges & Innovations, NCAR Archives, Available Online at: <https://www.archives.ucar.edu/exhibits/vinlally/challenges-innovations>, retrieved from Internet on Sep. 3, 2018, 2 pages.

Farley, "BalloonAscent: 3-D Simulation Tool for the Ascent and Float of High-Altitude Balloons", American Institute of Aeronautics and Astronautics, Available Online at: <https://ntrs.nasa.gov/search.jsp?R=20050243623>, retrieved from Internet on Sep. 3, 2018, 15 pages.

Morel, et al., "The Occurence of Icing on Constant Level Balloons", Journal of Applied Meteorology, vol. 7, Aug. 1968, pp. 626-634.

* cited by examiner

300

800

850

SUPERPRESSURE BALLOON THERMAL CONTROL WITH LOW-EMISSIVITY CAP AND ACTIVE AIR VENTING

BACKGROUND

Telecommunications connectivity via the Internet, cellular data networks and other systems is available in many parts of the world. However, there are many locations where data connectivity is unavailable, unreliable or subject to outages from natural disasters. Some systems may provide network access to remote locations or to locations with limited networking infrastructure via satellites or high altitude platforms (HAPs) located in the stratosphere. In the latter case, due to environmental conditions and other limitations, it is challenging to keep the platforms aloft and operational for long durations, such as days, weeks or more.

Lighter-than-air HAPs, such as those employing superpressure balloons, are subject to diurnal temperature changes and other conditions, which can adversely affect the balloon envelope. For instance, there can be significant temperature swings between full sunlight during the day and the absence of sunlight at night. These temperature swings correspondingly increase and decrease the gas pressure within the envelope. In addition, clouds beneath the balloon may reflect light upwards, and heat may be radiated up from the ground. These effects can also impact the balloon's temperature. Repeated pressure changes can put undue stress on the envelope, which may reduce the HAP's lifespan.

SUMMARY

Aspects of the technology provide balloon configurations that effectively regulate balloon temperature, thereby enhancing the balloon's longevity and durability. In particular, the technology employs a partial balloon covering (hat) coupled with active air venting.

According to one aspect, a balloon is configured for operation in the stratosphere, in which the balloon comprises an envelope, a ventilation system, an air intake assembly, a base member, an envelope cover and a control system. At least one gore panel forms the envelope, which is configured to maintain pressurized lifting gas therein. The ventilation assembly is disposed along a first section of the envelope. The air intake assembly is disposed along a second section of the envelope remote from the ventilation assembly. The base member is disposed along a bottom of the envelope and configured to couple to a payload. The envelope cover overlays a portion of the envelope adjacent to the first section thereof. The envelope cover is configured to maintain heat within the envelope and reflect light away from the envelope. The control system is configured to sense at least one of temperature or pressure within the envelope and, in response to the sensed at least one of temperature or pressure, is also configured to cause the ventilation assembly to expel air from within the envelope and cause the air intake assembly to draw ambient air into the envelope. This will cause a reduction in temperature within the envelope while achieving a selected pressure within the envelope.

In one example, the ventilation assembly is disposed along an apex of the envelope. Here, the air intake assembly may be disposed adjacent the base member. The ventilation assembly may include one or more valves configured for actuation by the control system. The air intake assembly may comprise at least one of a turbine or a compressor to draw in the ambient air. The control system may comprise an altitude control system, which includes the ventilation assembly and the air intake assembly.

The balloon may further comprise at least one of a temperature sensor and a pressure sensor operatively coupled to the control system. The temperature sensor is configured to measure at least one of an internal balloon temperature or an ambient atmospheric temperature, and the pressure sensor is configured to measure an internal pressure of the balloon. The balloon may be a superpressure balloon in which the envelope includes a ballonet disposed therein.

The control system may be configured to maintain the selected pressure to achieve a buoyancy requirement of the balloon. For instance, the buoyancy requirement may be selected for a current time and position of the balloon in the stratosphere. The buoyancy requirement may alternatively or additionally be selected for a future time and position of the balloon in the stratosphere.

In another example, the balloon further comprises a solar power generation module. Here, the control system may be configured to cause the air intake assembly to draw ambient air into the envelope only during a time when the solar power generation module is able to generate power. In a further example, the balloon also includes the payload. By way of example, the payload may have one or more communication modules configured to provide radio frequency or free space optical communication with either another aerial vehicle or a ground-based device. The control system may be configured to cause the ventilation assembly to expel air from within the envelope and to cause the air intake assembly to draw ambient air into the envelope concurrently.

According to another aspect, a balloon is configured for operation in the stratosphere, in which the balloon comprises an envelope, a ventilation and air intake assembly, a base member, an envelope cover and a control system. At least one gore panel forms the envelope, which is configured to maintain pressurized lifting gas therein. The ventilation and air intake assembly is disposed along a first section of the envelope. The base member is disposed along a bottom of the envelope and configured to couple to a payload. The envelope cover overlays a portion of the envelope adjacent to a section thereof, and is configured to maintain heat within the envelope and reflect light away from the envelope. The control system is configured to sense at least one of temperature or pressure within the envelope and, in response to the sensed at least one of temperature or pressure, is configured to cause the ventilation and air intake assembly to expel warmer air from within the envelope and to cause the ventilation and air intake assembly to draw cooler ambient air into the envelope from the external environment. This causes a reduction in temperature within the envelope while achieving a selected pressure within the envelope. In one example, the control system is configured to sequentially alternate expulsion of the warmer air and drawing in of the cooler ambient air.

According to another aspect, a method is provided for actively venting a balloon assembly configured to operate in the stratosphere. The balloon assembly including an envelope and an envelope cover overlaying a portion of the envelope to maintain heat within the envelope and reflect light away from the envelope. The method comprises sensing, by one or more sensors of the balloon assembly, at least one of a temperature or a pressure within the envelope; causing, by a control system of the balloon, a ventilation assembly to expel air from within the envelope; and causing, by the control system, an air intake assembly to draw ambient air into the envelope, thereby reducing a temperature within the envelope while achieving a selected pressure within the envelope. Causing the ventilation assembly to expel air from within the envelope and causing the air intake assembly to draw ambient air into the envelope may be performed concurrently. Furthermore, the selected pressure may be maintained to achieve a buoyancy requirement of the balloon.

DETAILED DESCRIPTION

Overview

Figure 1:
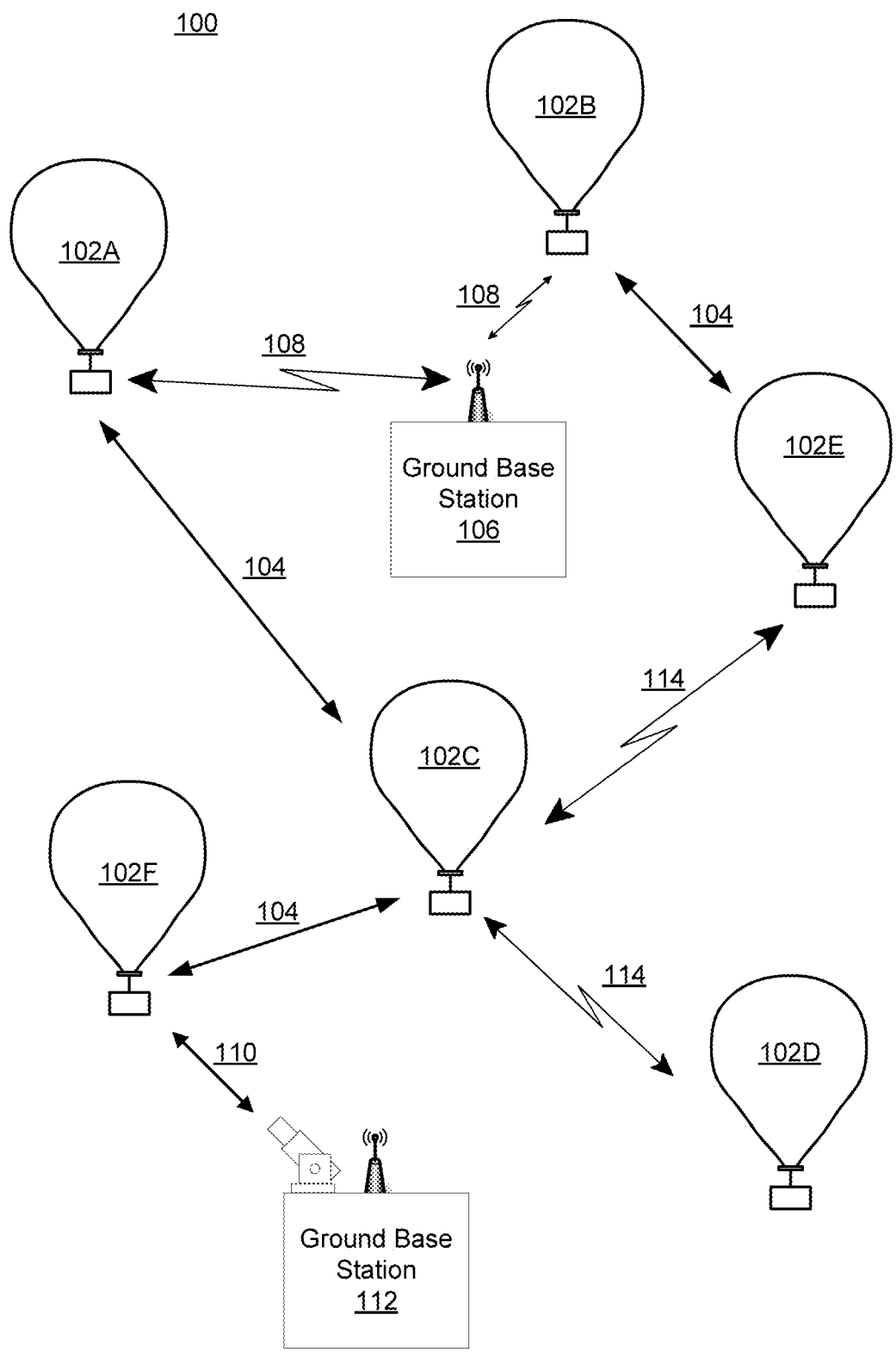
FIG. 1 is a functional diagram of an example system in accordance with aspects of the disclosure.

One type of HAP structure suitable for long-duration stratospheric operation is the superpressure balloon. A superpressure balloon is designed so that when it reaches float altitude (e.g., between about 60,000-120,000 feet above sea level, or more or less), the lifting gas fills out and pressurizes the balloon's envelope. However, diurnal temperature changes can adversely affect the envelope of a superpressure balloon. For instance, there can be significant temperature swings between the full sunlight during the day and the absence of sunlight at night. These temperature swings correspondingly increase and decrease the gas pressure within the balloon's envelope. Such temperature swings create the maximum pressure that the envelope must withstand. The bigger the swings, the greater the envelope's tensile strength must be. In particular, changes in temperature of the enclosed gas result in changes in pressure in the envelope. In order to maintain control over altitude, the envelope should maintain a constant volume and always be pressurized. The envelope therefore needs to contain a quantity of gas such that the gauge pressure never drops below zero at the coldest temperatures, and the envelope must be strong enough to withstand the pressures experienced at the highest temperatures. The range of temperatures experienced by the balloon determine how strong, and heavy, its envelope must be.

In addition, during the day clouds beneath the balloon may reflect light upwards. Heat may also be radiated up from the ground, although at night clouds may block or otherwise limit such radiation. These effects can also impact the balloon's temperature. Continued increases and decreases in pressure can stress the balloon envelope, potentially creating leaks or tears that degrade performance and reduce the length of time the balloon can remain aloft. Temperature regulation for the envelope can beneficially reduce such pressure changes. In turn, this may reduce the possibility of envelope failure by reducing repetitive material deformation. It may also allow for the use of thinner and lighter envelope materials, which can correspondingly permit an increase in the weight of the payload that can be carried aloft by the balloon.

The technology relates to regulation of balloon temperature for lighter-than-air HAPs, such as those designed to operate in the stratosphere. As explained below, balloon coverings ("hats") are employed to cover portions of the balloon envelope. The covering, e.g., aluminized mylar, overlies at least a top region of the envelope. This provides an opaque or otherwise light-reflective layer with low emissivity that blocks or reflects optical and/or infrared light. Heat from within the envelope is reflected back from the covering toward the envelope, while light from the sun is reflected back towards the environment. The covering is used to avoid heat loss at night or under other conditions, e.g., when cloudy. However, because using a covering can generally result in higher temperatures within the balloon under various conditions, the internal daytime temperature may become too warm within the envelope. This can increase the pressure and stress the envelope material. This situation is addressed by an active venting system which cools the gas within the envelope. These and other features are discussed in detail below. Before going into the specifics of the configurations that enable temperature regulation, a discussion of an overall balloon-based HAP is provided.

Example Balloon Systems

FIG. 1 depicts an example system 100 in which the balloons-based HAPs described above may be employed. This example should not be considered as limiting the scope of the disclosure or usefulness of the features described herein. System 100 may be considered a "HAP network." In this example, the network 100 includes a plurality of devices, such as of balloons 102A-F as well as ground-base stations 106 and 112. Balloon network 100 may also include a plurality of other devices, such as drones or other UAVs as well terrestrial equipment such as client communications devices and backhaul links.

The devices in system 100 are configured to communicate with one another. As an example, the balloons may include communication links 104 and/or 114 in order to facilitate intra-balloon communications. By way of example, links 114 may employ radio frequency (RF) signals (e.g., millimeter wave transmissions) while links 104 employ free-space optical transmission. Alternatively, all links may be RF, optical, or a hybrid that employs both RF and optical transmission. In this way balloons 102A-F may collectively function as a mesh network for packet data communications. At least some of the balloons may be configured for communications with ground-based stations 106 and 112 via respective links 108 and 110, which may be RF and/or optical links.

In one scenario, a given balloon 102 may be configured to transmit optical signals via an optical link 104. In one example, the given balloon 102 may use one or more high-power light-emitting diodes (LEDs) to transmit the optical signals. Alternatively, some or all of the balloons 102 may include laser systems for free-space optical communications over the optical links 104. Other types of free-space optical communication are possible. Further, in order to receive an optical signal from another balloon via an optical link 104, the balloon may include one or more optical receivers.

The balloons may also utilize one or more of various RF air-interface protocols for communication with ground-based stations via respective communication links. For instance, some or all of balloons 102A-F may be configured to communicate with ground-based stations 106 and 112 via RF links 108 using various protocols described in IEEE 802.11 (including any of the IEEE 802.11 revisions), cellular protocols such as GSM, CDMA, UMTS, EV-DO, WiMAX, 4G, 5G and/or LTE, and/or one or more propriety protocols developed for balloon-ground RF communication, among other possibilities.

In some examples, the links may not provide a desired link capacity for balloon-to-ground communications. For instance, increased capacity may be desirable to provide backhaul links from a ground-based gateway. Accordingly, an example network may also include downlink balloons, which could provide a high-capacity air-ground link between the various balloons of the network and the ground-base stations. For example, in balloon network 100, balloon 102F may be configured as a downlink balloon.

Like other balloons in network 100, downlink balloon 102F may be operable for communication (e.g., RF or optical) with one or more other balloons via link(s) 104. Downlink balloon 102F may also be configured for free-space optical communication with ground-based station 112 via an optical link 110. Optical link 110 may therefore serve as a high-capacity link (as compared to an RF link 108) between the balloon network 100 and the ground-based station 112. Downlink balloon 102F may additionally be operable for RF communication with ground-based stations 106. In other cases, downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

A downlink balloon may be equipped with a specialized, high bandwidth RF communication system for balloon-to-ground communications, instead of, or in addition to, a free-space optical communication system. The high bandwidth RF communication system may take the form of an ultra-wideband system, which may provide an RF link with substantially the same capacity as one of the optical links 104.

In a further example, some or all of balloons 102A-F could be configured to establish a communication link with space-based satellites and/or other types of high altitude platforms such as drone-type UAVs, in addition or as an alternative to a ground based communication link. In some embodiments, a balloon may communicate with a satellite or other high altitude platform via an optical or RF link. However, other types of communication arrangements are possible.

As noted above, the balloons 102A-F may collectively function as a mesh network. More specifically, since balloons 102A-F may communicate with one another using free-space optical links, the balloons may collectively function as a free-space optical mesh network. In a mesh-network configuration, each balloon may function as a node of the mesh network, which is operable to receive data directed to it and to route data to other balloons. As such, data may be routed from a source balloon to a destination balloon by determining an appropriate sequence of links between the source balloon and the destination balloon.

The network topology may change as the balloons move relative to one another and/or relative to the ground. Accordingly, the balloon network 100 may apply a mesh protocol to update the state of the network as the topology of the network changes. For example, to address the mobility of the balloons 102A to 102F, the balloon network 100 may employ and/or adapt various techniques that are employed in mobile ad hoc networks (MANETs). Other examples are possible as well.

Balloon network 100 may also implement station-keeping functions to help provide a desired network topology. For example, station-keeping may involve each balloon 102A-F maintaining and/or moving into a certain position relative to one or more other balloons in the network (and possibly in a certain position relative to the ground). By way of example, a given balloon may include one or more propellers or other propulsion means for lateral movement, for instance to move against the wind. As part of this process, each balloon may implement station-keeping functions to determine its desired positioning within the desired topology or relative to a particular service area, and if necessary, to determine how to move to the desired position.

The desired topology may vary depending upon the particular implementation and whether or not the balloons are continuously moving. In some cases, balloons may implement station-keeping to provide a substantially uniform topology where the balloons function to position themselves at substantially the same distance (or within a certain range of distances) from adjacent balloons in the balloon network 100. Alternatively, the balloon network 100 may have a non-uniform topology where balloons are distributed more or less densely in certain areas, for various reasons. As an example, to help meet the higher bandwidth demands, balloons may be clustered more densely over areas with greater demand (such as urban areas) and less densely over areas with lesser demand (such as over large bodies of water). In addition, the topology of an example balloon network may be adaptable allowing balloons to adjust their respective positioning in accordance with a change in the desired topology of the network.

The balloons of FIG. 1 may be high-altitude balloons that are deployed in the stratosphere. As an example, in a high altitude balloon network, the balloons may generally be configured to operate at altitudes between 18 km and 25 km or more in order to avoid interference with commercial flights and to take advantage of different wind speeds and directions. In order for the balloons to provide a reliable mesh network in the stratosphere, where winds may affect the locations of the various balloons in an asymmetrical manner, the balloons may be configured to move latitudinally and/or longitudinally relative to one another by adjusting their respective altitudes, such that the wind carries the respective balloons to the respectively desired locations.

Figure 2A:
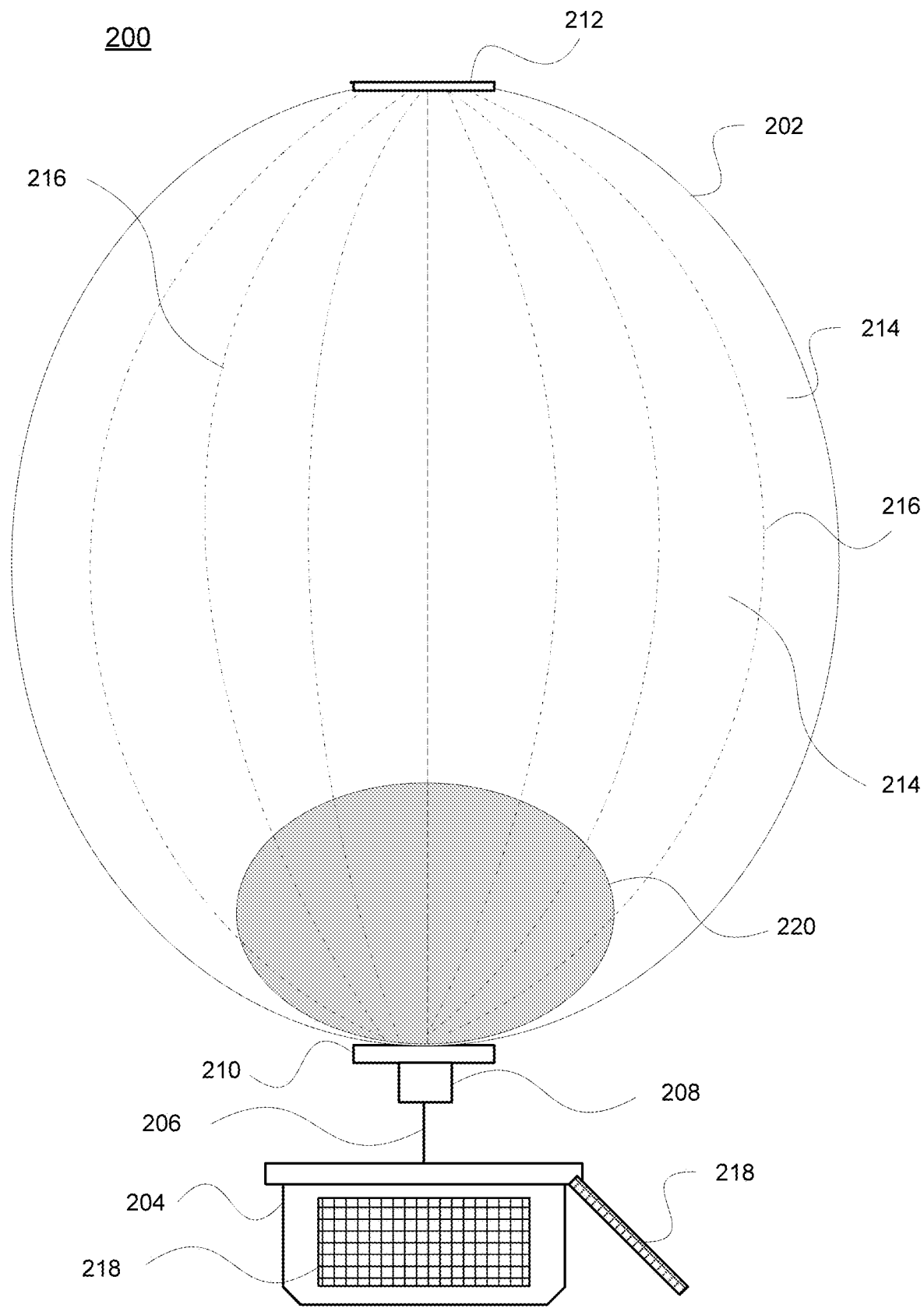
FIGS. 2A-B illustrate balloon configurations in accordance with aspects of the disclosure.

In example configurations the high altitude balloons include an envelope and a payload, along with various other components. FIG. 2A illustrates one example of a high-altitude balloon 200, which may represent any of the balloons of FIG. 1. As shown, the example balloon 200 includes an envelope 202, a payload 204, a coupling 206 between the envelope and payload, as well as a termination (e.g., cut-down) device 208 to separate the envelope from the payload. Upon termination, a parachute (not shown) may deploy to carry the payload 204 safely to the ground.

A base plate 210 is shown adjacent to a bottom end of the envelope 202, with a top or apex plate 212 opposite the base plate 210. In the superpressure arrangement as shown, the envelope may be formed from a plurality of gores 214 sealed to one another and coupled at the ends to the base and top plates. Tendons (e.g., webbing or load tape) 216, illustrated by the dash-dot lines, are shown extending generally longitudinally from the top plate 212 to the base plate 210. The tendons are configured to provide strength to the gore sections and to help the envelope withstand the load created by the pressurized gas within the envelope when the balloon is in use. By way of example only, there may be a 1:1 correspondence between the number of gores and the number of tendons. Alternatively, there may be more (or less) tendons than gores.

The envelope 202 may take various forms. For instance, the envelope 202 may be made of materials such as biaxially-oriented polyethylene terephthalate ("BoPET"). Additionally, or alternatively, some or all of the envelope 202 may be constructed from a highly-flexible latex material or rubber material such as chloroprene. Other materials or combinations thereof may also be employed. Furthermore, the shape and size of the envelope 202 may vary depending upon the particular implementation. Additionally, the envelope 202 may be filled with different types of lift gases, such as helium and/or hydrogen. Other types of lift gases, and combinations thereof, are possible as well.

One or more solar panels 218 may be arranged along the payload 204 to generate electricity for use by various on-board systems. And a ballonet (bladder) 220 is shown disposed within the envelope 202. During flight, the balloon may use changes in altitude to achieve navigational direction changes. In this regard, the ballonet 220 holds ballast gas (e.g., air) therein, while the envelope 202 hold lift gas around the ballonet. Alternatively, in a reverse ballonet configuration, the ballonet may hold lift gas therein and the envelope may hold ballast gas (e.g., air) around the ballonet. In one example, an altitude control system may be positioned at or near the base plate 210 to effect changes in altitude.

Figure 2B:
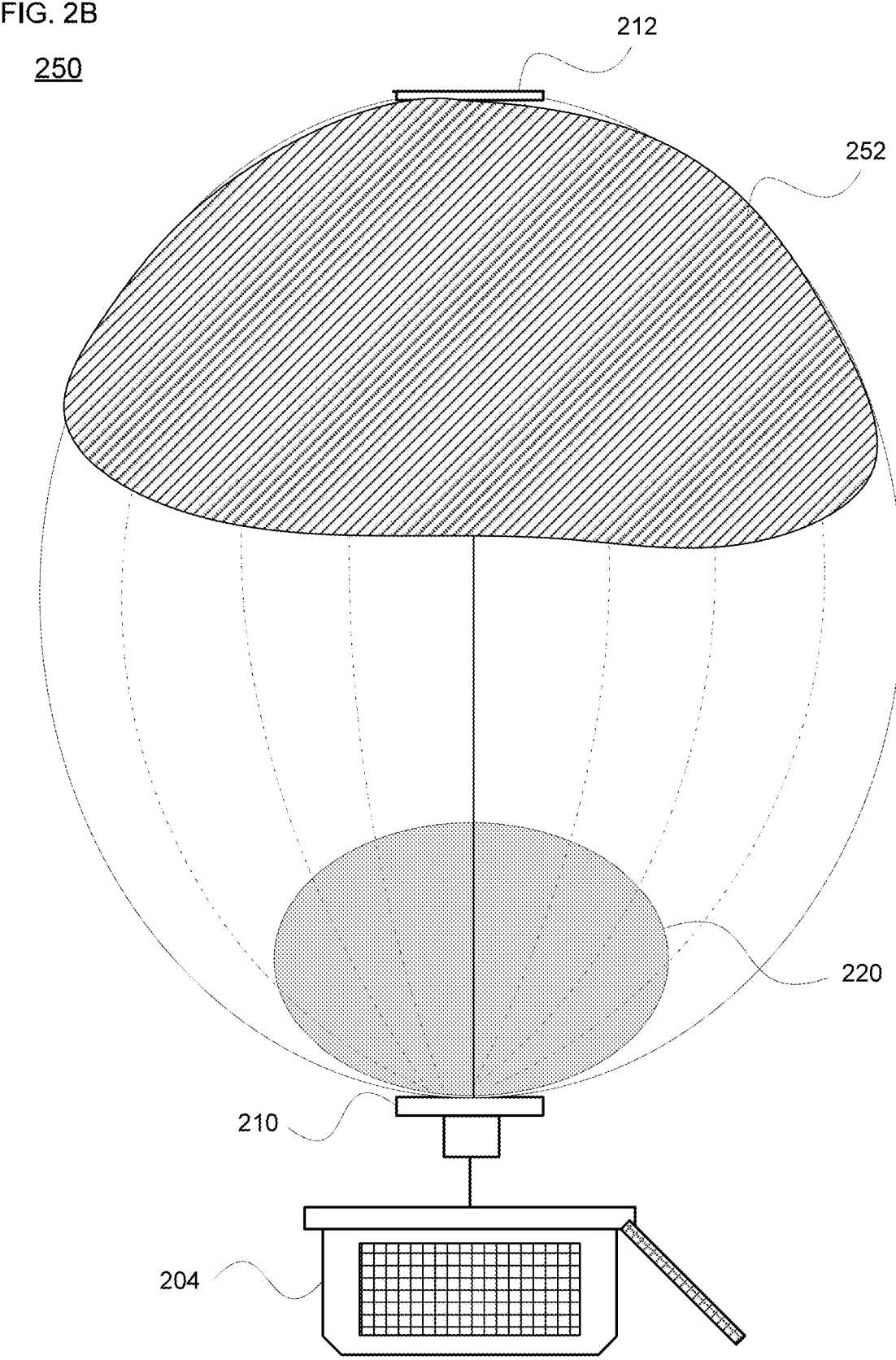

FIG. 2B illustrates another example of a high-altitude balloon 250, which is similar to the example 200 of FIG. 2A, except that it has a covering 252. The covering 252 reflects or otherwise blocks sunlight to prevent it from reaching the envelope. There is a tradeoff between effective temperature regulation and the weight of the covering. Furthermore, depending on the material used, a solid covering may help limit infrared radiation from the balloon at night but may also result in higher daytime temperatures. Thus, the ballonet may be modulated to regulate the balloon temperature, which is discussed further below.

Figure 3:
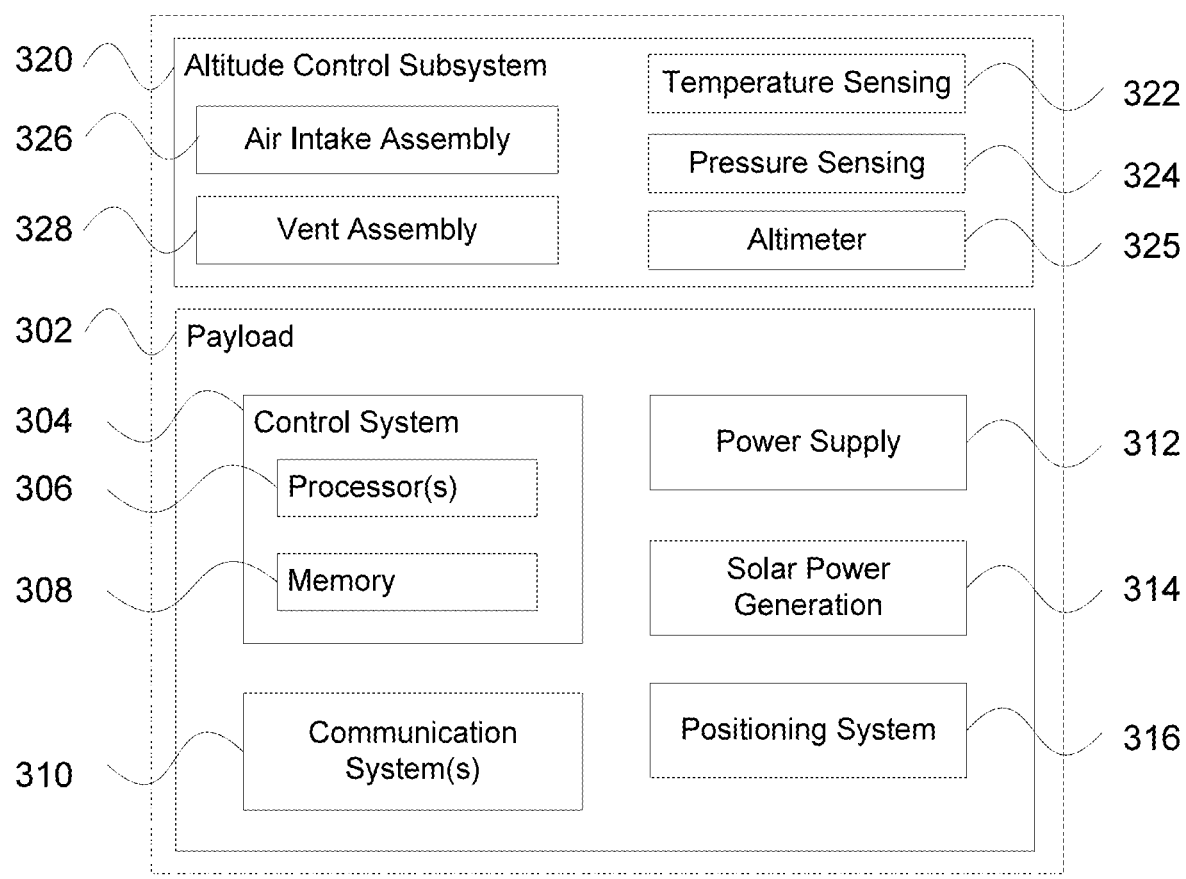
FIG. 3 is an example payload arrangement in accordance with aspects of the disclosure.

FIG. 3 illustrates an example 300 of a flight capsule including a payload 302 and an altitude control system 320. The payload 302 includes a control system 305 having one or more processors 306 and on-board data storage in the form of memory 308. Memory 308 stores information accessible by the processor(s) 306, including instructions that can be executed by the processors. The memory 308 also includes data that can be retrieved, manipulated or stored by the processor. The memory can be of any non-transitory type capable of storing information accessible by the processor, such as a hard-drive, memory card, ROM, RAM, and other memories. The instructions can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance.

The data can be retrieved, stored or modified by the one or more processors 304 in accordance with the instructions. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 306 can include any conventional processors, such as a commercially available CPU. Alternatively, each processor can be a dedicated component such as an ASIC, controller or other hardware-based processor. Although FIG. 3 functionally illustrates the processor(s) 306, memory 308 and other elements of control system 304 as being within the same block, the system can actually comprise multiple processors, computers, computing devices, and/or memories that may or may not be stored within the same physical housing. For example, the memory can be a hard drive or other storage media located in a housing different from that of control system 304. Accordingly, references to a processor, computer, computing device, or memory will be understood to include references to a collection of processors, computers, computing devices, or memories that may or may not operate in parallel.

The payload 302 may also include various other types of equipment and systems to provide a number of different functions. For example, as shown the payload 302 includes one or more communication systems 310, which may transmit signals via RF and/or optical links as discussed above. The communication system(s) 310 include communication components such as one or more transmitters and receivers (or transceivers), one or more antennae, and a baseband processing subsystem. (not shown).

The payload 302 is illustrated as also including a power supply 312 to supply power to the various components of balloon. The power supply 312 could include one or more rechargeable batteries. In addition, the balloon flight capsule may include a solar power generation system 314 as part of the power supply. The solar power generation system 314 may include solar panels (see 218 in FIG. 2A) and could be used to generate power that charges and/or is distributed by the power supply 312.

The payload 302 may additionally include a positioning system 316. The positioning system 316 could include, for example, a global positioning system (GPS) such as a differential GPS module, an inertial navigation system, and/or a star-tracking system. The positioning system 316 may additionally or alternatively include various motion sensors (e.g., accelerometers, magnetometers, gyroscopes, and/or compasses). The positioning system 316 may additionally or alternatively include one or more video and/or still cameras, and/or various sensors for capturing environmental data. Some or all of the components and systems within payload 302 may be implemented in a radiosonde or other probe, which may be operable to measure, e.g., pressure, altitude, geographical position (latitude and longitude), temperature, relative humidity, and/or wind speed and/or wind direction, among other information.

Payload 302 may include a navigation system (not shown) separate from, or partially or fully incorporated into control system 302. The navigation system may implement stationkeeping functions to maintain position within and/or move to a selected geographic location. In particular, the navigation system may use wind data to determine altitudinal and/or directional adjustments that result in the wind carrying the balloon in a desired direction and/or to a desired location. Alternatively, the adjustments may be computed by a ground based or satellite based control system and communicated to the HAP. In other embodiments, specific balloons may be configured to compute altitudinal/directional adjustments for other balloons and transmit the adjustment commands to those other balloons.

As illustrated in FIG. 3, the system also includes an altitude control system (ACS) configured to carry out certain positioning adjustments. The ACS may include sensors for temperature sensing 322 and/or pressure sensing 324, as well as an altimeter 325 to determine the HAP's altitude. It may also include an air intake assembly 326 and a vent assembly 328, for instance to increase and decrease the amount of air within the ballonet. While shown separately, the air intake and vent assemblies may be integrated as one unit. And as discussed further below, regulation of the air into and out of the ballonet can also be employed to adjust the balloon's temperature.

Example Configurations

Figure 4:
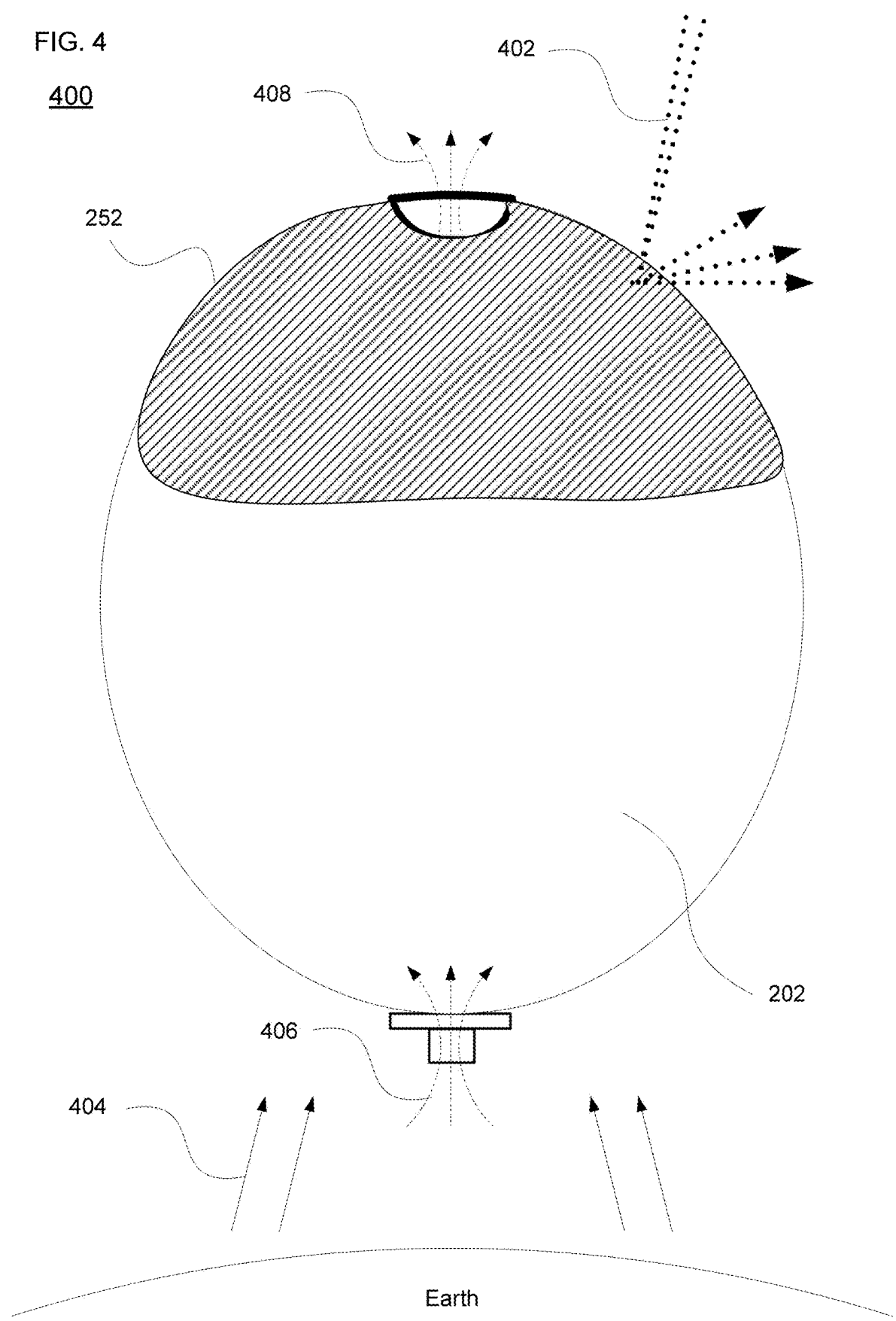
FIG. 4 is an example venting approach in accordance with aspects of the disclosure.

FIG. 4 illustrates a view 400 (not to scale) of a balloon configuration similar to the configuration 250 of FIG. 2B, in that it includes an envelope and a covering structure. A payload, ballonet, tendons, etc. are omitted for clarity. As shown, covering structure 252 overlies a top region of the envelope 202, providing an opaque or otherwise light-reflective layer that blocks or reflects optical and/or infrared light. The amount of coverage of the top region may vary. For instance, in one example between about ⅓ to ½ of the entire envelope is covered. In another example, no more than the upper region that lies above the equator (e.g., midpoint) of the envelope may be covered. In still further examples, the covering structure 252 may encompass at least 10% of the envelope or no more than 75% of the envelope.

The covering structure may be aluminized mylar or some other reflective material with low emissivity that is able to lay over the balloon envelope during operation in the stratosphere. In one example, the reflective material may be, e.g., between 4-10 μm thick, or more or less. During assembly of the balloon, the covering structure may be draped on top of the balloon envelope. The covering structure can be affixed to the balloon envelope at the apex and around its circumference so that it does not appreciably move during launch. In addition to being affixed along the apex, e.g., by securing to the apex or top plate, the covering structure may also be attached at other points directly or indirectly to the envelope. For instance, connection points may be bonded, taped or otherwise adhered directly to the envelope. The covering structure may underlie the tendons, so that the tendons restrain the covering structure and press it against the envelope. This may include connection elements securing the covering structure to the tendons and/or to the envelope. The covering structure may be alternatively or additionally be secured to the envelope at many points or regions therealong, e.g., by adhesive materials or glues.

More generally, it is desirable that the material for the covering structure have high reflectivity and therefore low emissivity in both the solar spectrum (~0.2 to 2.0 microns) and the thermal spectrum (~10 microns). The combination of solar and thermal reflectivities and emissivities of the covering structure and the rest of the envelope, as well as the size/configuration of the covering structure, result in the temperature of the balloon envelope being elevated over the ambient air temperature in most conditions while decreasing (or not significantly increasing) the swing between lowest and highest temperatures. A configuration that results in the balloon always being warmer than ambient temperature means that the strategy of flowing cool ambient air through the balloon can always be used to modulate its temperature. Furthermore, the maximum temperature at midday should coincide with an abundant excess solar power to run cooling fans. It is also possible to integrate the covering structure and envelope materials as long as the temperature goals above are met. However, in certain configurations it may be more practical to use a strong material for the envelope and a reflective material for the covering structure rather than a single material that is simultaneously both strong and reflective, especially if that single material would be heavier than a combination of the other materials.

The covering structure, as shown by the dotted arrows 402 in FIG. 4, is designed to reflect sunlight away from the upper portion of the balloon. Thus, during daytime operation the covering can help to avoid a temperature increase due to sunlight. During nighttime operation, the covering may help retain heat within the envelope by reducing radiation into space. As a result, the covering provides beneficial temperature regulation for the envelope, reducing diurnal fluctuations. This can help reduce pressure variations within the envelope, thereby reducing stress on the structure and prolonging flight operations.

However, as indicated by the solid arrows 404, heat in the form of upwelling infrared light may be reflected from the Earth's surface toward the balloon. This can cause heating of the balloon envelope because the covering is not located along the bottom region of the envelope. In addition, heating from below during the daytime can cause an increase in the envelope temperature because the covering will reduce the amount of heat that can radiate upward.

By way of example only, in one scenario a balloon with no covering may have a nighttime temperature of 230° K and daytime temperature of 250° K, for a day/night ratio of 250/230=1.09. A balloon with a solid covering structure may have a higher nighttime temperature of 240° K because the covering reduces heat leakage. But in this case, the daytime temperature of the balloon may be on the order of 261° K, which is increased because the covering reduces heat leakage during the daytime as well. This also results in a day/night ratio of 1.09. It can be desirable to minimize the diurnal temperature ratio to as close to 1.0 as possible, since that will reduce pressure changes in the envelope.

Thus, according to one aspect of the technology, the HAP employs a venting system to draw in cooler ambient air from the external environment as shown by dashed arrows 406, while expelling warmer air from within the envelope as shown by dashed arrows 408. For instance, a vent along the apex of the balloon envelope can be opened to release hotter air while actively pumping colder ambient air into the envelope, for instance using the balloon's altitude control system. While an active pumping operation with the ACS uses power, this would occur during a time when the on-board solar panels are generating power from sunlight. As shown, the covering 252 may include an opening to enable expulsion of the warmer air from within the envelope. Alternatively the venting system may be placed so that the covering does not overly or otherwise prevent expulsion of air from the balloon.

According to one example, the ACS or another control system of the HAP evaluates the current temperature, pressure and/or altitude. These measurements may be made by the temperature and pressure sensing modules and the altimeter as shown in FIG. 3. The system, for example the control system, may also evaluate expected future conditions like the sun going down, a planned altitude change, passing over a large storm system, etc. Evaluation of present and future conditions may be employed to best budget power among cooling operations, navigation, battery storage and other modules onboard the HAP. By way of example, control of the ACS may depend on system conditions and forecasts. This can be done by a main payload controller, or by an independent ACS controller that receives information from the payload Based on this information, a valve on the vent assembly may be opened to expel hot air while a turbine, compressor or other component would be actuated to draw in cooler ambient air. These operations may be performed concurrently. Offsetting the pumping and venting would cause variations in the total air ballast in the envelope, causing altitude variations for the HAP. If the wind is consistent over this range of altitudes, the offset approach may be desirable, as it causes additional convection over the outside of the envelope and cooling. Or if altitude oscillations would traverse different layers of wind speed or direction, this could impact navigation. In some instances this may be undesirable; however, in others the HAP may use the change in wind speed or direction to perform station-keeping over an area of interest or modify its trajectory to head towards a particular target location.

The control system is configured to manage the venting and intake to achieve a desired temperature while equalizing mass flow to maintain buoyancy. Sensor information received from the temperature, pressure and/or altimeter sensing components is received by the control system to evaluate envelope conditions and selectively actuate the air intake and/or vent assemblies. For instance, is it beneficial to monitor the relative pressure between the envelope and ambient external environment, as well as the temperature both inside and outside the balloon's envelope. Both out of tolerance over pressurization (resulting in burst) and out of tolerance under pressurization (resulting in uncontrolled descent) are critical situations that must be avoided. Thus, actuation of the vent and air intake assemblies is carefully regulated by the control system to stay within an acceptable tolerance range. By way of example, the control system may store temperature, pressure and/or altitude information in a lookup table in memory, along with tolerance information based on the size, shape and/or material of the envelope. Based on this, once the cooling process is complete and the internal envelope temperature has been brought down to a desired level, the vent valve is closed and the turbine, compressor or other intake component would cease drawing in air.

Different architectures can be employed for the air intake and vent assemblies. Regardless of the exact architecture, as shown in the figures a multi-chamber system is incorporated into the HAP so that air can be pumped in and out of the envelope. A single-chamber balloon with only lift gas could not use this approach, so a ballonet arrangement is employed.

Figure 5:
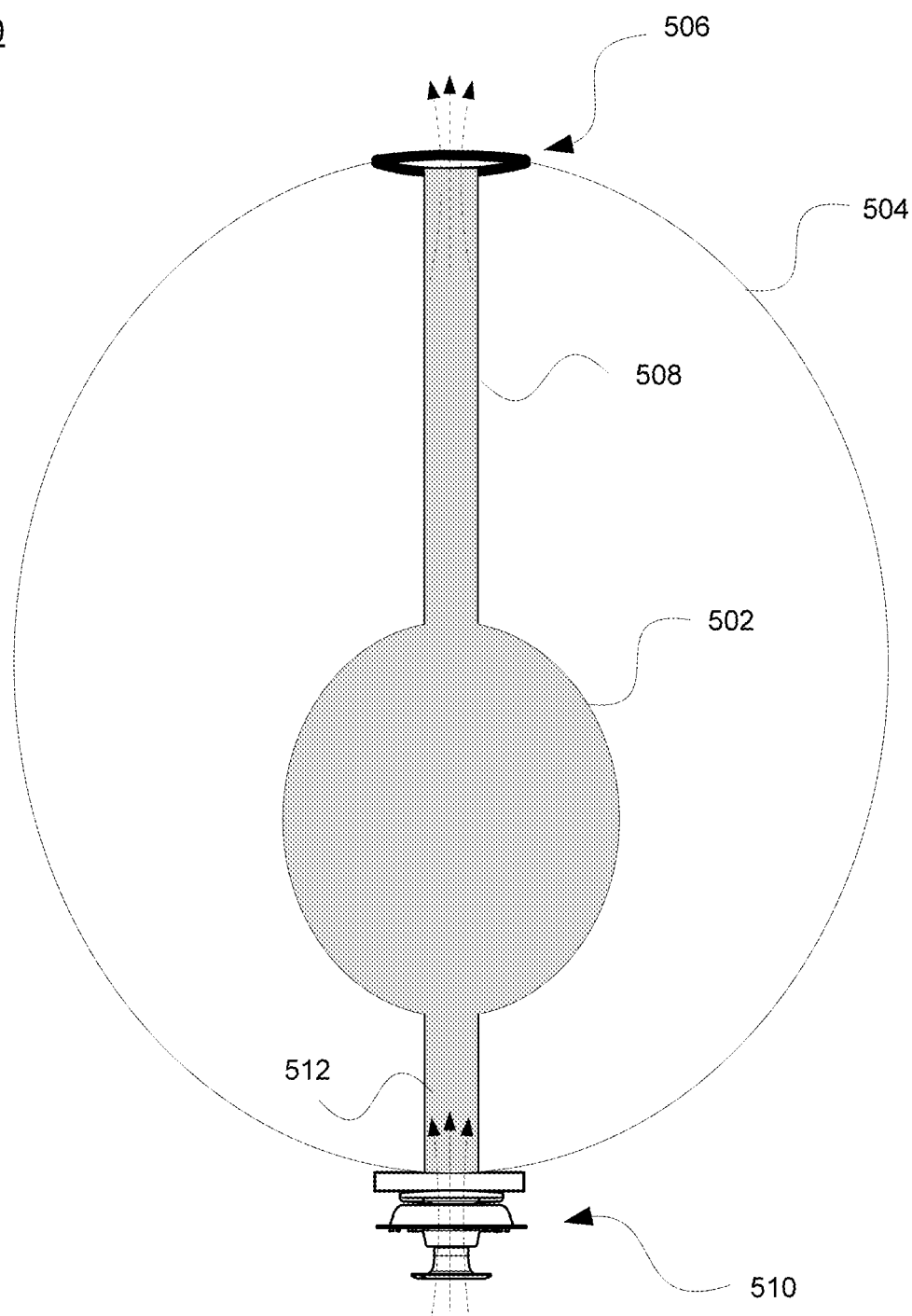
FIG. 5 illustrates a balloon configuration according to aspects of the technology.

FIG. 5 illustrates one example 500 in which a ballonet 502 is received within envelope 504. In this example, lift gas is stored in the envelope 504 and air is stored in the ballonet 502. As shown, the chamber of the ballonet 502 is coupled at one end to a vent assembly 506 via a first channel 508, and to an air intake assembly 510 via a second channel 512. While not shown, both the vent assembly 506 and air intake assembly 510 are operated by the HAP's control system or a control module of the ACS. In this case, based on the current and/or predicted envelope conditions (temperature, pressure and/or altitude), a valve of the vent assembly is opened so that warm air from the ballonet 502 travels outward via the first channel 508 and is expelled out of the vent assembly 506. And the air intake assembly is actuated to draw in cooler ambient air from the external environment into the ballonet 502 via the second channel 512. The expelling and drawing in of air may be performed until a particular temperature is obtained for the air within the ballonet or for the lift gas within the envelope, for instance to achieve a selected temperature will minimize the diurnal temperature ratio. By way of example only, gate valves, butterfly valves, diaphragm valves, and plunger valves may all be used for venting.

Figure 6:
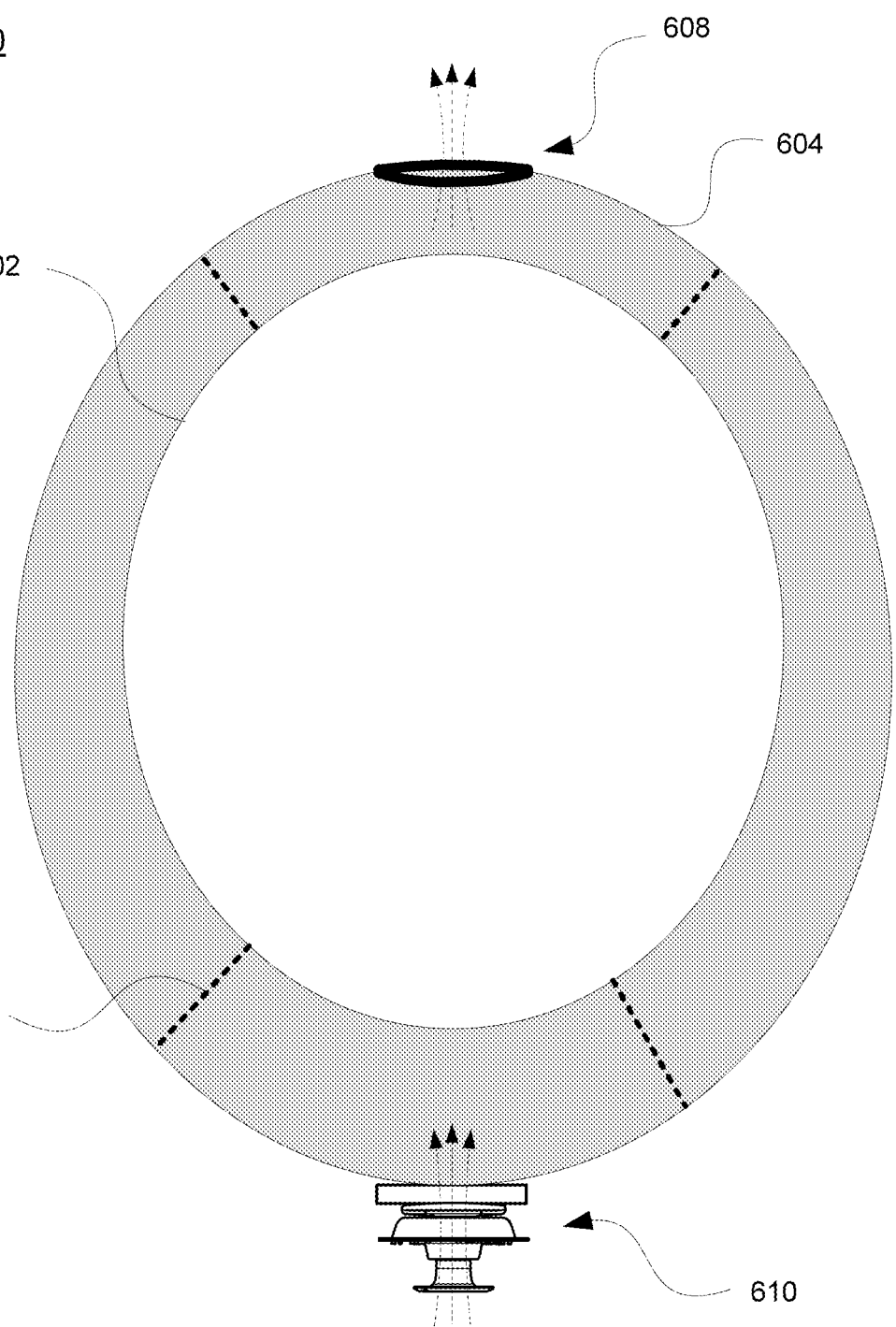
FIG. 6 illustrates another balloon configuration according to aspects of the technology.

FIG. 6 illustrates another example 600 in which a ballonet 602 is received within envelope 604. In this example, lift gas is stored in the ballonet and air is stored within the envelope surrounding the ballonet. As shown by the dashed lines, the ballonet may be secured to the envelope via one or more connections 606. Alternatively, the ballonet may be affixed along the sidewall of the envelope. As with the example of FIG. 5, a vent assembly 608 and a separate air intake assembly 610 are employed. And as in the above example, while not shown both the vent assembly and air intake assembly are operated by the HAP's control system or a control module of the ACS. In this case, based on the current and/or predicted envelope conditions (temperature, pressure and/or altitude), a valve of the vent assembly is opened so that warm air from the envelope is expelled out of the vent assembly. And the air intake assembly is actuated to draw in cooler ambient air from the external environment into the envelope. The expelling and drawing in of air may be performed until a particular temperature is obtained for the air within the envelope or for the lift gas within the ballonet, for instance to achieve a selected temperature will minimize the diurnal temperature ratio.

Figure 7:
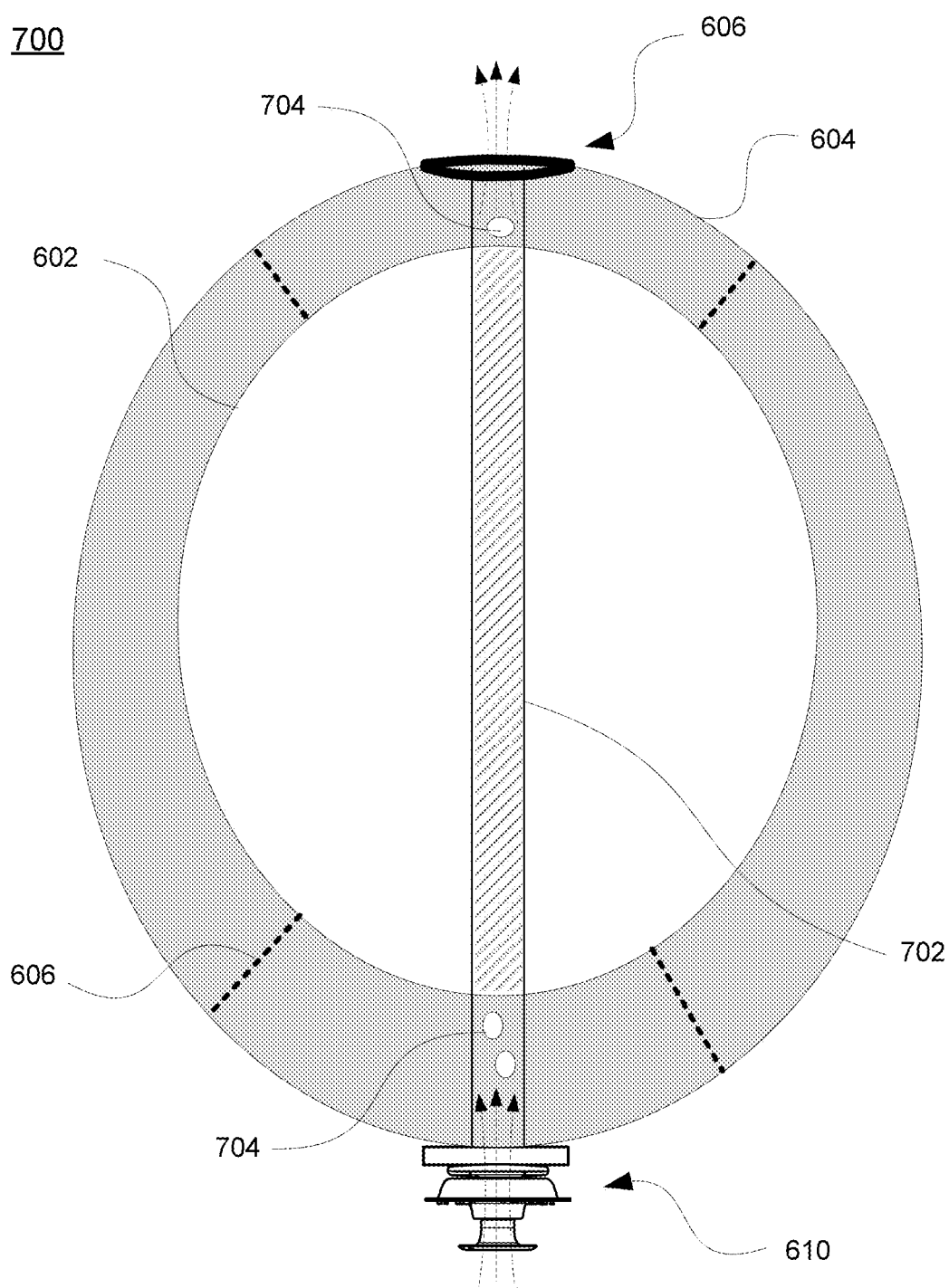
FIG. 7 illustrates a further balloon configuration according to aspects of the technology.

FIG. 7 illustrates an example 700 similar to FIG. 6, with the ballonet 602 received within envelope 604. As with example 600, lift gas is stored in the ballonet and air is stored within the envelope surrounding the ballonet. As shown by the dashed lines, the ballonet may be secured to the envelope via one or more connections 606. Alternatively, the ballonet may be affixed along the sidewall of the envelope. And as with the example of FIG. 5, a vent assembly 608 and a separate air intake assembly 610 are employed, which are operated by the HAP's control system or a control module of the ACS. In example 700, the vent assembly and air intake assembly are coupled via a conduit 700, which is designed to pass ambient air through it. In this scenario, the conduit may be partly or fully surrounded by the ballonet. While one conduit is shown, multiple conduits may be employed. The conduit(s) passes cooler air drawn in from the air intake assembly adjacent to the ballonet and out through the vent assembly, in order to cool the lift gas in the ballonet. The conduit may also include one or more openings 704 for coupling the conduit to the envelope chamber, so that ambient air may flow into and out of the envelope chamber as well as along the conduit. This could promote even more rapid cooling of the ballonet. And as explained above, based on the current and/or predicted envelope conditions (temperature, pressure and/or altitude), a valve of the vent assembly is opened so that warm air from the conduit is expelled out of the vent assembly. And the air intake assembly is actuated to draw in cooler ambient air from the external environment into the conduit. The expelling and drawing in of air may be performed until a particular temperature is obtained for the air within the conduit (and envelope) or for the lift gas within the ballonet, for instance to achieve a selected temperature will minimize the diurnal temperature ratio.

Figure 8A:
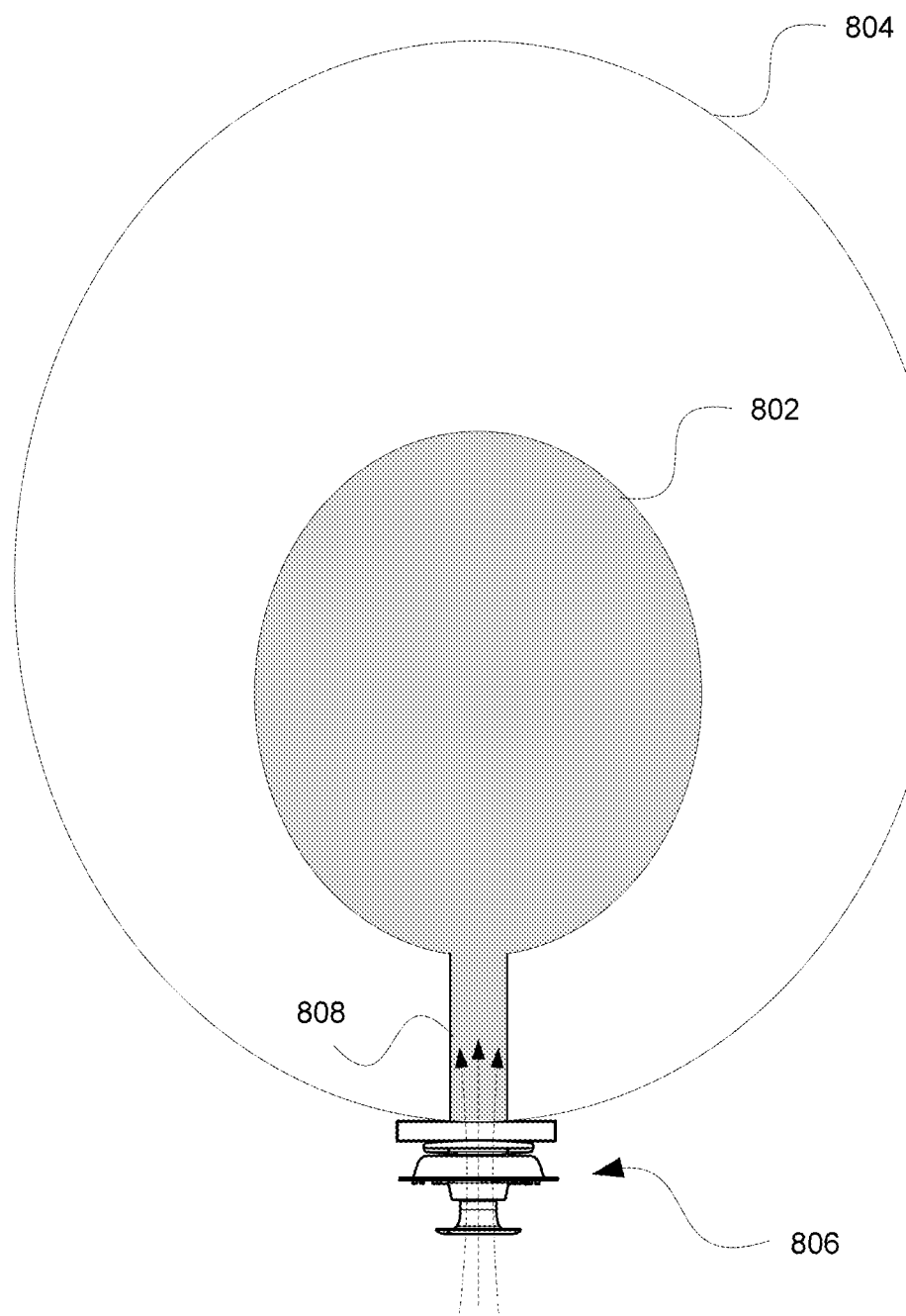
FIGS. 8A-B illustrate another balloon arrangement in accordance with aspects of the technology.
Figure 8B:
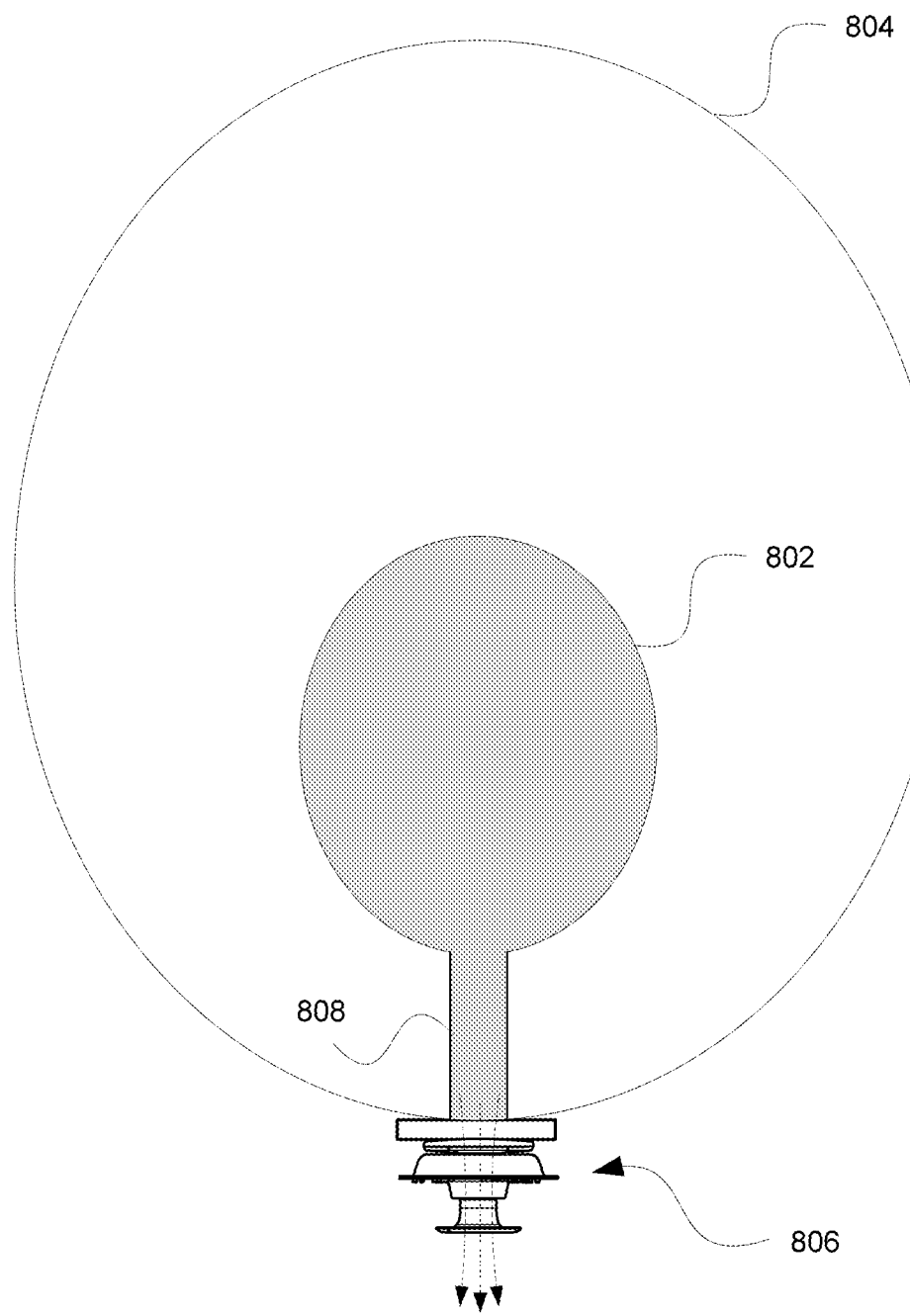

FIGS. 8A-B illustrate another configuration in which the air intake and vent assemblies are incorporated into a single structure, which enables cycling of ambient air into and out of the HAP via a single port. FIG. 8A illustrates a first view 800 in which a ballonet 802 is received within envelope 804. In this example, lift gas is stored in the envelope 804 and air is stored in the ballonet 802. The chamber of the ballonet 802 is coupled at one end to a vent and air intake assembly 806 via a channel 808. While not illustrated, the vent and air intake assembly 806 is operated by the HAP's control system or a control module of the ACS. As shown by the dashed arrows in the first view 800, cooler ambient air is drawn into the ballonet 802 via the channel 808. And as shown by the dashed arrows in the second view 850 of FIG. 8B, warmer air is expelled from the ballonet 802 via the channel 808. Here, as noted above, the system may carefully regulate actuation of the vent and air intake assembly 806 to stay within an acceptable tolerance range while achieving the desired temperature modulation.

Different arrangements may be employed for the vent assembly and air intake assembly, regardless of whether they are separate as in FIGS. 5-7, or integrated as in FIGS. 8A-B. By way of example, for the air intake assembly, axial and centrifugal air compressors are two types of air compressors that may be implemented. Axial compressors provide low pressure and high inlet/outlet air velocity and centrifugal air compressors provide high pressure and medium inlet/outlet air velocity. Axial air compressors are also limited to the extent that they are capable of only achieving a modest pressure rise. The drawback to the use of centrifugal air compressors, however, is the creation of waste heat, stagnated air, and overall inefficient compression of air. Mixed flow compressors are another type of air compressor. While traditional mixed flow compressors aim to combine the advantages of axial and centrifugal flow, the resulting combination is an air compressor that provides only moderate pressure and low inlet/outlet air velocity.

In one example, a mixed flow compressor of the air intake assembly may utilize an inlet-mounted motor. This mixed flow compressor design can allow for the use of a high power density motor to drive the air compressor by counteracting high levels of heat generated by the motor and mitigating the potential for motor failure because the motor is placed in the flow of cold air through the inlet of the device, cooling the motor. Furthermore, because the HAP may primarily rely upon wind currents for movement, there is no need for an air compressor to produce high pressure or high velocity to move the balloon at high speeds.

The mixed flow compressor assembly can include a diffuser, a compressor housing, including primary and secondary compressor housings, a motor mounted within the inlet of the first compressor housing, and an impeller. When assembled together, these components define a central cavity or plenum of the mixed flow compressor. An opening at one end of the compressor housing may form an intake at the inlet end of the compressor assembly. The compressor housing defines a cavity therethrough to enable ambient air to flow through the compressor housing and into the ballonet or envelope, depending on which balloon configuration is employed.

The primary compressor housing may be coupled to a diffuser. The secondary compressor housing may be positioned between the primary compressor housing the diffuser. The diffuser, primary compressor housing, and motor can be attached to the secondary compressor housing. The diffuser may be configured to convert the mechanical work done by a motor and an impeller of the compressor back into potential energy in the form of air pressure. The diffuser may efficiently convert the kinetic energy of the compressed, flowing air into higher pressure, static air in the envelope or ballonet of the balloon.

The impeller draws air from the environment surrounding the altitude control system into the inlet of the compressor assembly and through the central plenum. The air drawn from the environment may be extremely cold and flows through the inlet into the central plenum and around the motor. This may cool down the motor and dissipate heat generated by the motor to prevent overheating. Positioning the motor within the inlet, as opposed to an outlet end or elsewhere in the device, enables use of a motor having high power density.

The mixed flow compressor assembly design may combine axial and radial components to produce a diagonal airflow compressor stage. In the present design, the exit mean radius of the airflow can be greater than at the inlet, like in a centrifugal design, but the flow will exit the compressor in an axial rather than radial direction. This arrangement allows for a compressor assembly that is highly efficient. This is due in part to the cooling provided by the motor at the inlet end of the compressor.

The vent assembly may include one or more valve components, which can play an integral role in an altitude control and cooling of the HAP's balloon. The vent assembly can be used to regulate, direct, or control the flow of air by opening, closing, or partially obstructing a particular opening or passageway to the envelope or ballonet of the balloon. The vent assembly is configured to operate in extreme conditions. Long flights and extreme temperature changes are encountered by the HAP in the stratosphere.

Depending on the balloon configuration, the vent assembly may be mounted to the apex plate or elsewhere along the envelope separate from the air intake assembly. Or, when integrated with the air intake assembly, the vent assembly can be mounted to the inlet of an air compressor, such as the mixed flow air compressor described above, so that the inlet serves as the structural connection of the vent's valve component to balloon. This can allow for effective operation of the valve assembly at high altitudes and enable the air in the envelope or ballonet to remain sealed at extremely low air temperatures. Additionally, the vent assembly allows for a lightweight valve configuration that does not require maintenance during flight.

The vent assembly can include a motor mount, mounting stanchions, valve head, a driveshaft, a bearing assembly, a motor coupler, and a motor. The motor mount may be the base structure to which the various components of the vent assembly are mounted. The mounting stanchions can be used to join the valve assembly to the compressor inlet when the vent and air intake assemblies are integrated. For instance, a valve head can be configured to increase or decrease the circumferential area of the inlet opening through which air can travel to or from the compressor inlet and the envelope or ballonet. The movement of the driveshaft is able to control movement of the valve head into and away from the compressor inlet. The bearing assembly can extend around the driveshaft to facilitate rotational movement of the driveshaft. The motor coupler and the motor facilitate rotation of the driveshaft, which further causes movement of the valve along the driveshaft between a fully extended distal position and a retracted proximal position. In one scenario, in a fully extended position the valve head and a seal carried by the valve head can be pressed up and into the air compressor inlet. The valve head can regulate the air of the envelope or ballonet. As the valve head moves into a retracted position away from the inlet and into the retracted proximal position, the seal retracts from the surface of the compressor inlet, allowing the air to escape to the external environment as described above.

According to another embodiment, the active venting approaches described above can be employed without using the covering. Without the covering, there is a smaller temperature difference in the daytime between the balloon's overall internal temperature and the ambient air. This means that more airflow and more power is required for air intake and venting to achieve the same temperature change. The larger temperature difference with the covering means that less power needs to be spent running the temperature regulation system to get the same fractional change in temperature. Thus, without the covering, the balloon could reach lower-than-ambient temperatures at night. The ACS and vent could still be used to raise the temperature and maintain positive pressure, but this may depend on how much battery power is available to run the ACS at night.

Figure 9:
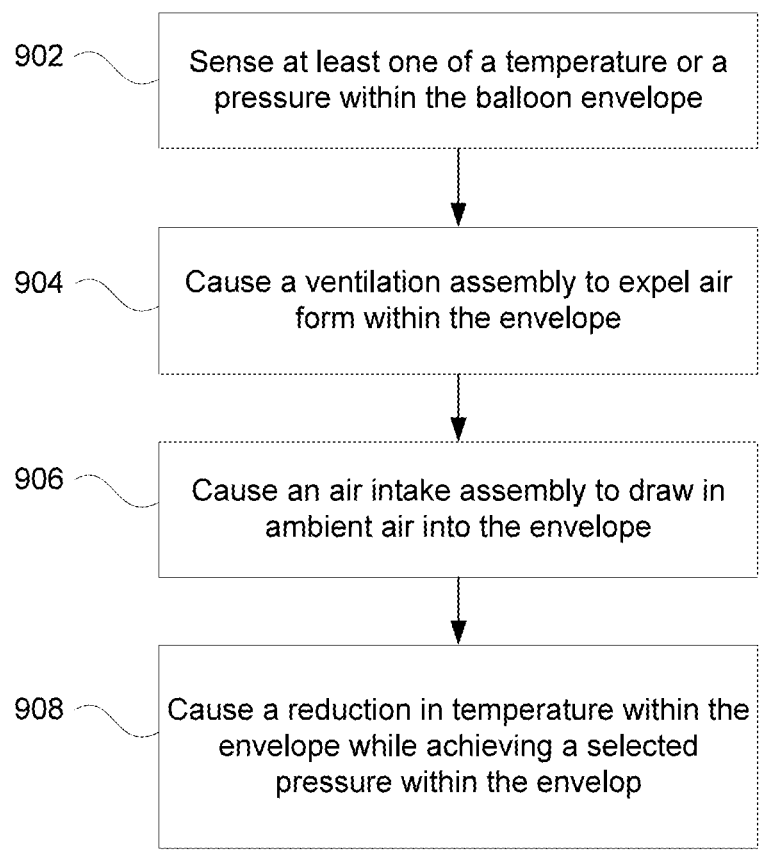
FIG. 9 is an example method of balloon operation in accordance with aspects of the technology.

FIG. 9 illustrates an example of operating a HAP to regulate the balloon temperature (or pressure) as described above via active venting. The HAP comprises a balloon assembly configured to operate in the stratosphere. The balloon assembly includes an envelope and an envelope cover overlaying a portion of the envelope to maintain heat within the envelope and reflect light away from the envelope. As shown in block 902, the method includes sensing, by one or more sensors of the balloon assembly, at least one of a temperature or a pressure within the envelope. At block 904, a control system of the balloon causes a ventilation assembly to expel air from within the envelope. At block 906, the control system causes an air intake assembly to draw ambient air into the envelope. As indicated in block 908, these operations thereby reduce a temperature within the envelope while achieving a selected pressure within the envelope. The active venting and introduction of ambient air may be performed concurrently. The method may be performed so that a selected pressure is maintained to achieve a buoyancy requirement of the balloon.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A balloon configured for operation in the stratosphere, the balloon comprising:
   at least one gore panel forming an envelope, the envelope configured to maintain pressurized lifting gas therein;
   a ventilation assembly disposed along a first section of the envelope;
   an air intake assembly disposed along a second section of the envelope remote from the ventilation assembly;
   a base member disposed along a bottom of the envelope and configured to couple to a payload;
   an envelope cover overlaying a portion of the envelope adjacent to the first section thereof, the envelope cover configured to maintain heat within the envelope and reflect light away from the envelope; and
   a control system configured to sense at least one of temperature or pressure within the envelope and, in response to the sensed at least one of temperature or pressure, to:
      cause the ventilation assembly to expel air from within the envelope;
      cause the air intake assembly to draw ambient air into the envelope; and
      thereby reducing a temperature within the envelope while achieving a selected pressure within the envelope.

2. The balloon of claim 1, wherein the ventilation assembly includes one or more valves configured for actuation by the control system.

3. The balloon of claim 1, wherein the air intake assembly comprises at least one of a turbine or a compressor to draw in the ambient air.

4. The balloon of claim 1, wherein the control system comprises an altitude control system, and the altitude control system includes the ventilation assembly and the air intake assembly.

5. The balloon of claim 1, further comprising at least one of a temperature sensor and a pressure sensor operatively coupled to the control system, the temperature sensor being configured to measure at least one of an internal balloon temperature or an ambient atmospheric temperature, and the pressure sensor being configured to measure an internal pressure of the balloon.

6. The balloon of claim 1, wherein the balloon is a superpressure balloon and the envelope includes a ballonet disposed therein.

7. The balloon of claim 1, further comprising a solar power generation module, wherein the control system is configured to cause the air intake assembly to draw ambient air into the envelope only during a time when the solar power generation module is able to generate power.

8. The balloon of claim 1, wherein the control system is configured to cause the ventilation assembly to expel air from within the envelope and to cause the air intake assembly to draw ambient air into the envelope concurrently.

9. The balloon of claim 1, wherein the ventilation assembly is disposed along an apex of the envelope.

10. The balloon of claim 9, wherein the air intake assembly is disposed adjacent the base member.

11. The balloon of claim 1, further comprising the payload.

12. The balloon of claim 11, wherein the payload includes one or more communication modules configured to provide radio frequency or free space optical communication with either another aerial vehicle or a ground-based device.

13. The balloon of claim 1, wherein the control system is configured to maintain the selected pressure to achieve a buoyancy requirement of the balloon.

14. The balloon of claim 13, wherein the buoyancy requirement is selected for a current time and position of the balloon in the stratosphere.

15. The balloon of claim 13, wherein the buoyancy requirement is selected for a future time and position of the balloon in the stratosphere.

16. A method of actively venting a balloon assembly configured to operate in the stratosphere, the balloon assembly including an envelope and an envelope cover overlaying a portion of the envelope to maintain heat within the envelope and reflect light away from the envelope, the method comprising:
- sensing, by one or more sensors of the balloon assembly, at least one of a temperature or a pressure within the envelope;
- causing, by a control system of the balloon, a ventilation assembly to expel air from within the envelope; and
- causing, by the control system, an air intake assembly to draw ambient air into the envelope;
  - thereby reducing a temperature within the envelope while achieving a selected pressure within the envelope; and
  - wherein causing the ventilation assembly to expel air from within the envelope and causing the air intake assembly to draw ambient air into the envelope are performed concurrently.

17. The method of claim 16, wherein the selected pressure is maintained to achieve a buoyancy requirement of the balloon.

\* \* \* \* \*